United States Patent
Watabe (10) Patent No.: US 7,961,082 B2
(45) Date of Patent: Jun. 14, 2011

(54) TIRE INFLATION PRESSURE DETECTION SYSTEM

(75) Inventor: Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 261 days.

(21) Appl. No.: 12/407,213

(22) Filed: Mar. 19, 2009

(65) Prior Publication Data

US 2009/0237228 A1  Sep. 24, 2009

(30) Foreign Application Priority Data

Mar. 19, 2008 (JP) ................. 2008-071335

(51) Int. Cl.
*B60C 23/00* (2006.01)

(52) U.S. Cl. .................. 340/426.33; 340/442; 340/443; 340/447; 73/146; 73/146.2

(58) Field of Classification Search ............. 340/426.33, 340/442, 443, 447; 73/146, 146.2, 146.4, 73/146.5

See application file for complete search history.

(56) References Cited

U.S. PATENT DOCUMENTS

| | | | |
|---|---|---|---|
| 6,218,936 B1 | 4/2001 | Imao | |
| 7,576,641 B2 * | 8/2009 | Ide | 340/447 |
| 2004/0044450 A1 | 3/2004 | Taguchi et al. | |
| 2006/0012469 A1 | 1/2006 | Hirai | |
| 2007/0008097 A1 | 1/2007 | Mori et al. | |
| 2009/0179749 A1 * | 7/2009 | Huang et al. | 340/447 |

FOREIGN PATENT DOCUMENTS

| | | |
|---|---|---|
| JP | 11-203582 | 7/1999 |
| JP | 2005-170133 | 6/2005 |
| JP | 2006-015895 | 1/2006 |
| JP | 2006-123725 | 5/2006 |

* cited by examiner

*Primary Examiner* — Davetta W Goins
(74) *Attorney, Agent, or Firm* — Nixon & Vanderhye PC (57) ABSTRACT

Transceiver ID information associated with a subject vehicle is accurately registered even when another vehicle having transceivers is nearby. During ID registration, a degree of a variance among received strength data elements is obtained in relation to a plurality of transceivers each having ID information associated therewith. ID information associated with data elements having a small degree of a variance is recognized as ID information of a transceiver attached to the subject vehicle. Therefore, ID information associated with transceivers attached to the subject vehicle can be reliably discriminated from ID information associated with transceivers attached to another vehicle.

5 Claims, 6 Drawing Sheets

| n | ID(n) | M(n) | 1 | 2 | 3 | 4 | 5 | 6 | 7 | 8 | 9 | 10 | 11 | 12 | 13 | 14 | 15 | 16 | 17 | 18 | 19 | 20 | STANDARD DEVIATION |
|---|---|---|---|---|---|---|---|---|---|---|---|---|---|---|---|---|---|---|---|---|---|---|---|
| 1 | A102B66F | 18 | 15 | 13 | 12 | 20 | 12 | 15 | 18 | 14 | 10 | 16 | 8 | 14 | 13 | 17 | 19 | 15 | 23 | 15 | N/A | N/A | 3.6 |
| 2 | 75C78A01 | 19 | 23 | 32 | 20 | 28 | 26 | 25 | 27 | 31 | 29 | 28 | 17 | 22 | 21 | 26 | 24 | 29 | 15 | 30 | 34 | N/A | 5.0 |
| 3 | 1F0BC023 | 18 | 40 | 41 | 35 | 36 | 43 | 39 | 38 | 39 | 41 | 42 | 41 | 41 | 41 | 40 | 44 | 37 | 39 | 41 | N/A | N/A | 2.3 |
| 4 | 2D61448E | 17 | 21 | 28 | 30 | 31 | 25 | 32 | 35 | 32 | 29 | 19 | 27 | 34 | 31 | 18 | 30 | 23 | 36 | N/A | N/A | N/A | 5.4 |
| 5 | 9056FA8C | 15 | 8 | 9 | 12 | 14 | 17 | 11 | 18 | 20 | 13 | 7 | 22 | 4 | 23 | 13 | 15 | N/A | N/A | N/A | N/A | N/A | 5.5 |
| 6 | 7169EC77 | 17 | 18 | 20 | 21 | 20 | 19 | 21 | 20 | 22 | 19 | 20 | 21 | 22 | 20 | 19 | 20 | 17 | 21 | N/A | N/A | N/A | 1.3 |
| 7 | 5F062B4A | 14 | 19 | 23 | 26 | 38 | 27 | 17 | 35 | 16 | 30 | 20 | 33 | 24 | 21 | 32 | N/A | N/A | N/A | N/A | N/A | N/A | 7.0 |
| 8 | 59715DB8 | 18 | 3 | 13 | 9 | 19 | 8 | 22 | 17 | 6 | 23 | 16 | 5 | 26 | 11 | 28 | 15 | 29 | 31 | 33 | N/A | N/A | 9.5 |
| 9 | 8F99C0C2 | 16 | 23 | 22 | 23 | 20 | 24 | 19 | 23 | 24 | 23 | 22 | 25 | 23 | 25 | 22 | 23 | 22 | N/A | N/A | N/A | N/A | 1.6 |
| 10 | 3B206E45 | 20 | 38 | 36 | 37 | 36 | 36 | 36 | 37 | 31 | 35 | 39 | 35 | 34 | 35 | 37 | 36 | 33 | 35 | 38 | 35 | 33 | 2.0 |

TIRE INFLATION PRESSURE DETECTION SYSTEM

CROSS REFERENCE TO RELATED APPLICATIONS

The present application is based on and claims priority to Japanese Application JP 2008-71335, filed on Mar. 19, 2008, the contents of which are incorporated herein by reference.

BACKGROUND OF THE INVENTION

1. Field of the Invention

The present invention relates to a system for directly detecting tire inflation pressure and more specifically to a transceiver including a pressure sensor that is directly attached to each of wheels and that transmits a detection signal produced by the pressure sensor to a receiver mounted on a vehicle body in order to detect a tire inflation pressure.

2. Description of the Related Art

In direct type tire inflation pressure detection systems, since a transceiver that sends tire inflation pressure data to a receiver on a vehicle body side is attached to each of wheels, if the transceiver is replaced with another during replacement of a tire, ID information inherent to the transceiver is changed to another. When the receiver receives a radio wave carrying tire inflation pressure data, the ID information is used to decide whether the radio wave is radiated from a subject vehicle or another vehicle. Therefore, when the ID information is changed to another, the new ID information has to be re-registered in the receiver. Methods described in JP-A-2000-71726, Japanese Patent No. 3661670, JP-A-2006-15895, and JP-A-2006-123725 have been proposed for automatically registering such ID information.

To be more specific, according to JP-A-2000-71726, a frequency of reception within a certain period is taken into account. Among multiple elements of data including unknown ID information having been received, elements of unknown ID information that are received frequently are recognized as elements of ID information associated with a subject vehicle, and registered.

According to Japanese Patent No. 3661670, based on data elements concerning the temperatures in tires and tire inflation pressures retrieved from multiple elements of received data including unknown ID information, data including ID information that is carried by a radio wave and contains the temperature in a tire or a tire inflation pressure that correlates to the driving pattern of a subject vehicle is registered as being associated with the subject vehicle. For example, as a subject vehicle continues to be driven, the temperatures in tires or tire inflation pressures increase. If data concerning a temperature in a tire or a tire inflation pressure represents a correlative result when correlated with previous data, the data is recognized as being associated with the subject vehicle and the ID information containing the data is registered.

According to JP-A-2006-15895 and JP-A-2006-123725, when radio waves carrying multiple elements of data including unknown ID information are received, a receiver on a vehicle body side measures the intensities of the received radio waves. Data elements including ID information associated with a subject vehicle are discriminated from data elements including ID information associated with another vehicle on the basis of the intensities, and are then registered.

However, if another vehicle is driven in relatively close proximity to the side of a subject vehicle, the reception of radio waves sent from the other vehicle being driven nearby becomes more frequent. Further data elements associated with the temperatures in tires or tire inflation pressures included in the radio waves of the other vehicle may correlate to the driven state of the subject vehicle. Still further, since the subject vehicle and the other vehicle are located mutually closely, the intensities of the radio waves received from the other vehicle are as large as those associated with the subject vehicle. Therefore, it becomes clear that in a situation where another vehicle is driven in relatively close proximity to the side of a subject vehicle, ID information cannot be accurately registered according to the above described techniques.

SUMMARY OF THE INVENTION

Accordingly, the present invention is intended to provide a tire inflation pressure detection system that can accurately register ID information associated with the subject vehicle even when another vehicle is driven in proximity to the side of a subject vehicle.

In order to accomplish the above intention a second control unit included in a receiver includes an ID registration means that automatically registers ID information on each of transceivers of a subject vehicle. The ID registration means includes a trigger output means for outputting a triggering signal from trigger machines at the time of performing ID registration procedure, a collecting means for receiving a frame every time the triggering signal is outputted and collecting received strength data elements in relation to each ID on the basis of ID information appended to the frame, a degree-of-variance arithmetic means for computing a degree of a variance among received strength data elements collected by the collecting means in relation to each ID, and a deciding means for recognizing ID information relating to a degree of a variance computed by the degree-of-variance arithmetic means and smaller than a threshold, as ID information associated with the transceiver attached to the subject vehicle, and registering the ID information.

When IDs are registered, a degree of a variance among received strength data elements is calculated in relation to each of the received IDs. An ID relating to a small degree of a variance is recognized as an ID of the transceiver attached to the subject vehicle. Therefore, even when the subject vehicle and another vehicle are driven side by side, the IDs of the transceivers attached to the subject vehicle can be reliably discriminated from the IDs of transceivers attached to the other vehicle.

Of data elements including ID information that relate to degrees of variances computed by the degree-of-variance arithmetic means and that are smaller than the threshold, the deciding means registers the same number of elements of ID information as the number of wheels of the subject vehicle to which the transceivers are attached and in ascending order of the degree of a variance.

Even if the number of data elements including ID information relating to degrees of variances smaller than the threshold is larger than the number of wheels of the subject vehicle to which the transceivers are attached, the ID information of the transceivers attached to the subject vehicle can be reliably discriminated from the ID information of the transceivers attached to the other vehicle.

A deciding means can recognize in ascending order of the degree of a variance computed by the degree-of-variance arithmetic means a same number of elements of ID information as the number of transceivers attached to the subject vehicle, as the elements of ID information of the transceivers attached to the subject vehicle, and can register the elements of ID information.

Alternatively, a degree of a variance need not be compared with the threshold, but IDs may be registered in ascending order of the degree of a variance. Nevertheless, the IDs of the transceivers attached to the subject vehicle can be reliably discriminated from the IDs of the transceivers attached to another vehicle.

As an index indicating such a degree of a variance, for example, a standard deviation or a variance value among received strength data elements can be adopted.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

Various exemplary and alternative exemplary embodiments will be described in conjunction with the drawings. In the drawings, the same reference numerals are assigned to the corresponding components of the embodiments as described herein below.

First Embodiment

Figure 1:
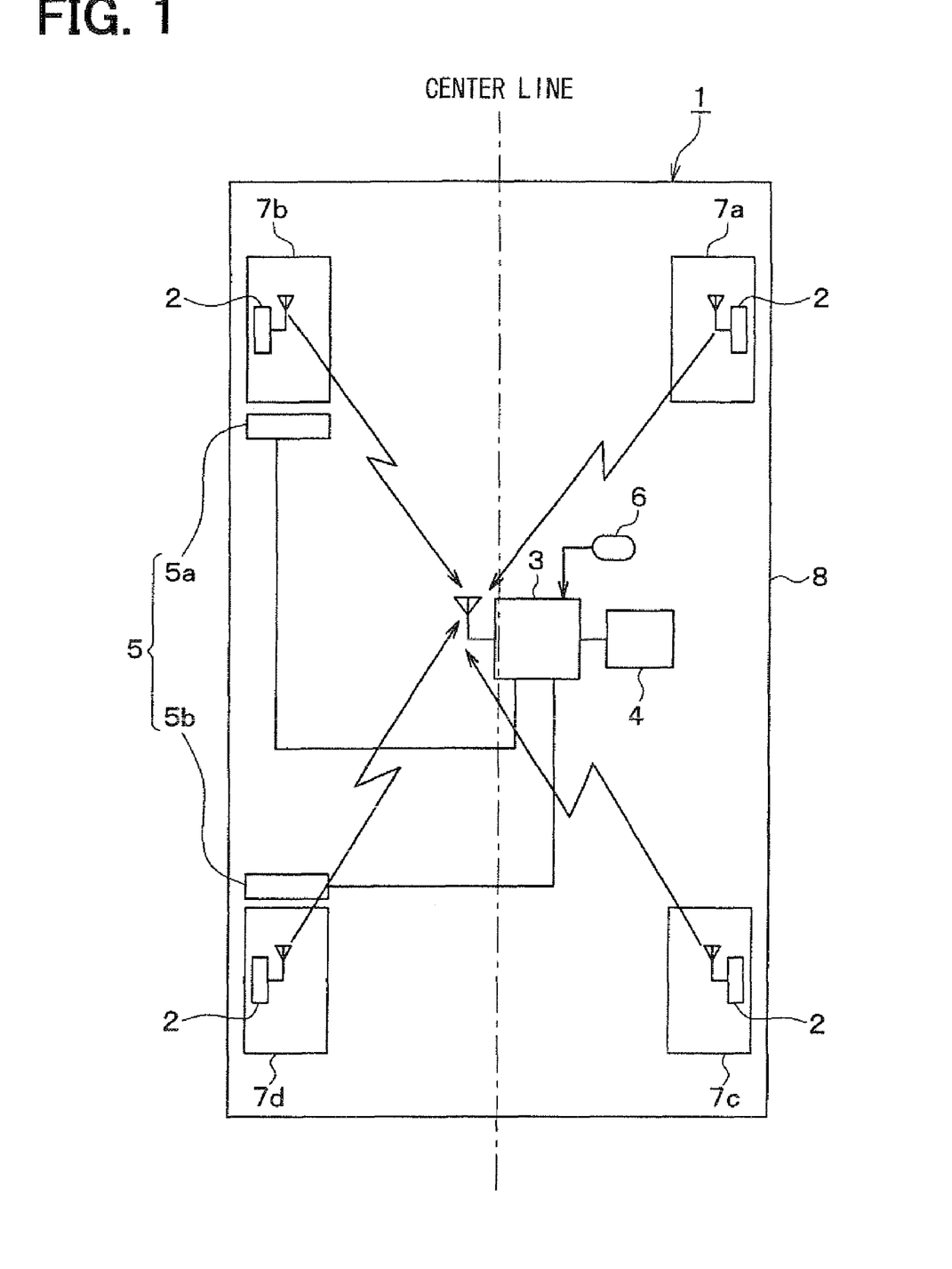
FIG. 1 is a block diagram illustrating an overall configuration of an exemplary tire inflation pressure detection system including a position-of-wheel detection system in accordance with a first embodiment.

Referring to the drawings, a first embodiment will be described below. FIG. 1 is a block diagram showing the overall configuration of a tire inflation pressure detection system of an embodiment. The top of FIG. 1 corresponds to the forward direction of a vehicle 1 and the bottom corresponds to the rearward direction of the vehicle 1.

As shown in FIG. 1, the tire inflation pressure detection system is mounted in the vehicle 1, and includes transceivers 2, a receiver 3, an indicator 4, trigger machines 5, and an ID registration initialization switch 6. In accordance with various embodiments, including the present embodiment, the above described structures and additional sub-structures as described herein below such as, for example control unit 22, can constitute an ID registration means for implementing an automatic registration procedure in accordance with the procedures as further described herein below.

Figure 2A:
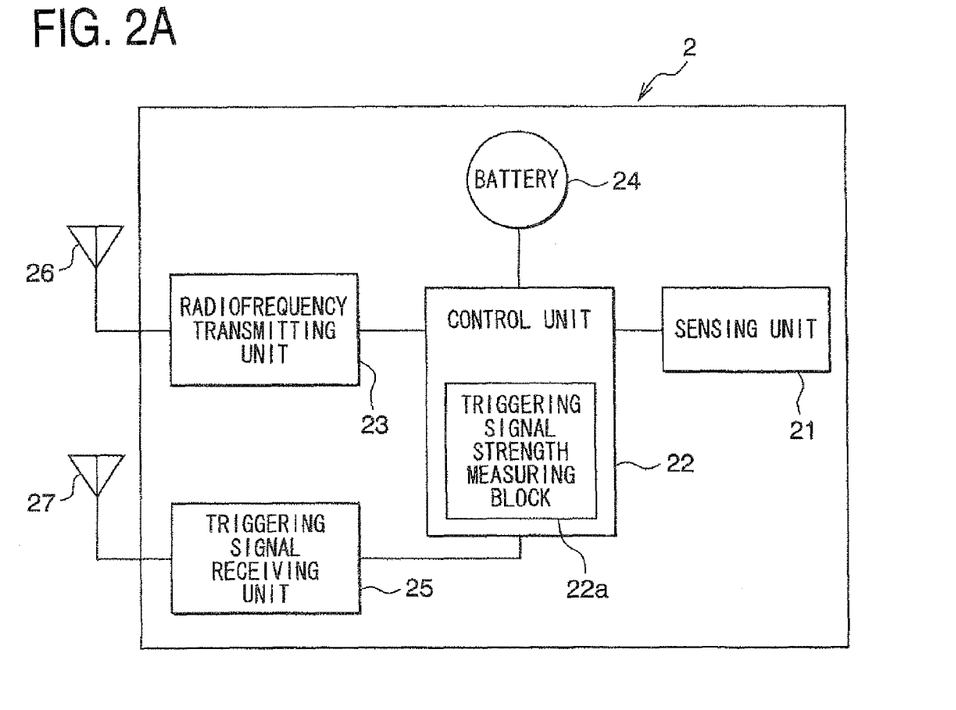
FIG. 2A is a block diagram illustrating a configuration of an exemplary transceiver included in a tire inflation pressure detection in accordance with a first embodiment.
Figure 2B:
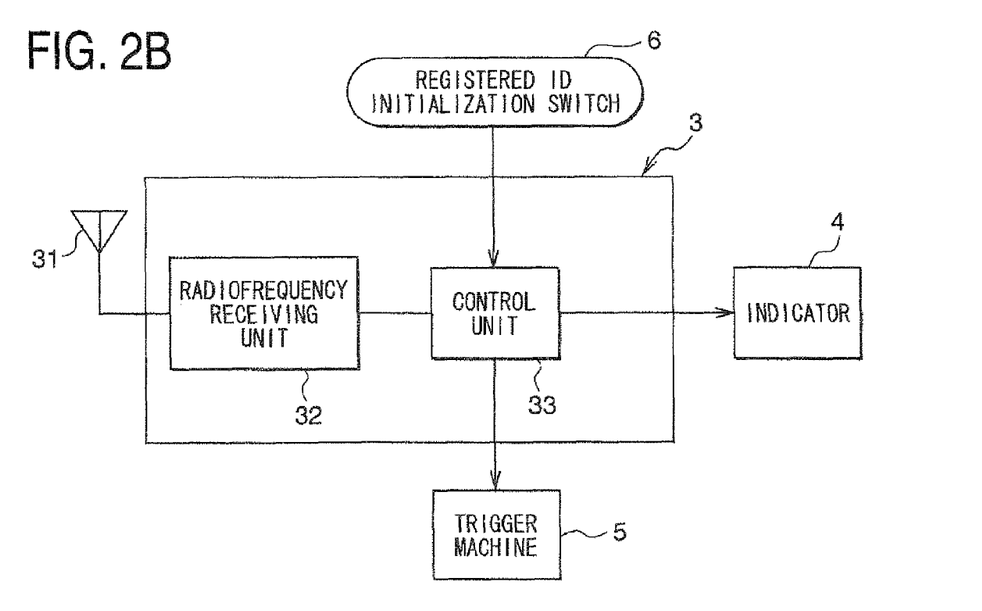
FIG. 2B is a block diagram illustrating a configuration of an exemplary receiver included in a tire inflation pressure detection system in accordance with a first embodiment.

The transceivers 2 are attached respectively to four operative wheels 7a to 7d of the vehicle 1 and can further be attached to a fifth wheel that includes a spare tire. Each of the transceivers 2 detects the inflation pressure of a tire attached to one of the wheels 7a to 7d, places data of a detection signal representing the result of the detection in a frame to be transmitted, and transmits the frame with ID information associated with the respective one of the transceivers 2 appended or pre-pended thereto. The receiver 3 is mounted on a vehicle body 8 in the vehicle 1, and receives the frame sent from each of the transceivers 2. The receiver 3 obtains a tire inflation pressure by performing various processing or computation on elements obtained on the basis of the detection signal contained in the frame. FIG. 2A and FIG. 2B show the block configurations of the transceiver 2 and receiver 3 respectively.

As shown in FIG. 2A, the transceiver 2 includes a sensing unit 21, a control unit 22, a radiofrequency transmitting unit 23, a battery 24, a triggering signal receiving unit 25, a transmitting antenna 26, and a receiving antenna 27.

The sensing unit 21 includes, for example, a diaphragm type pressure sensor or a temperature sensor, and outputs a detection signal proportional to a tire inflation pressure or a detection signal proportional to temperature.

The control unit or first control unit 22 may be formed with a known microcomputer including a central processing unit (CPU), a read only memory (ROM), a random access memory (RAM), and an input/output (I/O) interface, and executes predetermined processing according to a program stored in the ROM or the like.

To be more specific, the control unit 22 receives the detection signal associated with a tire inflation pressure, from the sensing unit 21, performs signal processing on the detection signal, if necessary, manipulates the detection signal, places data associated with the resultant detection signal and representing a result of detection, hereinafter called tire inflation pressure data, together with ID information inherent to each of the transceivers 2 in a frame to be transmitted, and then transmits the frame to the radiofrequency transmitting unit 23. The processing associated with transmitting the signal to the radiofrequency transmitting unit 23 is executed at intervals associated with a predetermined cycle according to the above described program.

When an ignition switch is turned off, the control unit 22 is normally put to a sleep state. When the control unit receives a triggering signal and inputs a start-up command contained in the triggering signal, the control unit 22 is changed from the sleep state to a wake-up state. A triggering signal strength measuring block 22a is included in the control unit 22, and receives the triggering signal from one of the trigger machines S via the receiving antenna 27 and triggering signal receiving unit 25. When the control unit 22 is put to the wake-up state, the triggering signal strength measuring block 22a measures the received strength of the triggering signal, that is, obtains a received signal strength indication (RSSI) value. The control unit 22 manipulates, if necessary, received strength data, contains the received strength data in a frame, in which tire inflation pressure data is contained, or any other frame, and then transmits the frame to the radiofrequency transmitting unit 23. The processing of measuring the received strength of a triggering signal or transmitting received strength data to the radiofrequency transmitting unit 23 is performed based on the above described program.

The control unit 22 controls the timing of sending a frame to the radiofrequency transmitting unit 23 in order to prevent collisions of data elements transmitted from the transceivers 2. For example, the transmitting timing signifying in what seconds after reception of a triggering signal a frame should be sent is determined differently among the transceivers 2. Therefore, frames are transmitted from the respective transceivers 2 attached to the wheels 7a to 7d at different times.

However, when the different transmitting times are merely stored in the control units 22 of the respective transceivers 2 so that frames will be transmitted from the respective transceivers 2 of the wheels 7a to 7d at the different times, the contents stored in the respective transceivers 2 are different from one another. Therefore, for example, a map making it possible to select a transmitting time according to a received strength or a functional equation for obtaining a transmitting time with a transmitted strength as a variable is stored in the control units 22 so that the transmitting time of the respective transceivers 2 will inevitably be differentiated from one another according to differences among received strengths. Thus, the same program can be used in common among the control units 22 of all the transceivers 2.

The program to be stored in the control units 22 may be described so that a transmitting time will be modified at random every time. If the transmitting timing is modified at random every time, the transmitting timings of the respective transceivers 2 can be differentiated from one another at a high probability.

The radiofrequency transmission unit 23 may function as an output unit that transmits a frame sent from the control unit 22, to the receiver 3 through the transmitting antenna 26 using a radio wave in a radiofrequency band, for example, at 315 MHz.

The triggering signal receiving unit 25 may function as an input unit to receive a triggering signal through the receiving antenna 27 and transmit the triggering signal to the control unit 22.

The battery 24 supplies power to the control unit 22 and others. With supply of power from the battery 24, collection of data elements concerning tire inflation pressures by the sensing unit 21 and various computations by the control unit 22 are carried out.

The transceiver 2 having the foregoing components is attached to, for example, an air injection valve in each of the wheels 7a to 7d, and disposed so that the sensing unit 21 thereof protrudes inside the tire. Thus, the transceiver 2 detects the tire inflation pressure and transmits a frame at intervals of a predetermined cycle, for example, one min through the transmitting antenna 26 included in the transceiver 2.

As shown in FIG. 2B, the receiver 3 includes an antenna 31, a radiofrequency receiving unit 32, and a control unit 33.

The antenna 31 is fixed to the vehicle body 8 and includes one common antenna through which frames sent from the respective transceivers 2 are received.

The radiofrequency receiving unit 32 may function as an input unit to input a frame sent from each of the transceivers 2 and received through the antenna 31, and to transfer the frame to the control unit 33.

The control unit 33 may be formed with a known microcomputer including a CPU, a ROM, a RAM, and an I/O interface, and executes predetermined processing according to a program stored in the ROM or the like. The stored program can operate the CPU in accordance with the various detailed procedures as will be described herein.

To be more specific, the control unit 33 deletes data elements associated with previously registered ID information in order to register new ID information and associated data elements, and then outputs a trigger command signal that commands the trigger machines 5 to output a triggering signal. Further, the control unit 33 receives a frame received by and transferred from the radiofrequency receiving unit 32, discriminates ID information associated with a subject vehicle from ID information associated with another vehicle on the basis of received strength data contained in the frame and representing the strength of the triggering signal received by each of the transceivers 2, and registers the ID information associated with the subject vehicle. The ID registration procedure will be detailed later.

The control unit 33 obtains a tire inflation pressure by performing various elements of signal processing and computations on the basis of data that represents a result of detection and that is contained in a received frame, and outputs an electric signal to the indicator 4 proportional to the obtained tire inflation pressure. For example, the control unit 33 compares the obtained tire inflation pressure with a predetermined threshold Th. When the control unit 33 senses that the tire inflation pressure has decreased, the control unit 33 outputs a signal signifying the decrease in inflation pressure to the indicator 4. Thus, information regarding which of the tire inflation pressures of the four wheels 7a to 7d has decreased is delivered to the indicator 4.

As shown in FIG. 1, the indicator 4 is located such that a driver can discern the indicator 4. The indicator is formed, for example, with a warning lamp disposed in an instrument panel of the vehicle 1. When a signal signifying that a tire inflation pressure has decreased is sent from the control unit 33, the indicator 4 provides an indication so as to warn the driver of the decrease in the tire inflation pressure.

The trigger machine 5 output a triggering signal having a predetermined signal strength and falling within a low-frequency band ranging, for example, from 125 kHz to 135 kHz, in response to input of a trigger command signal sent from the control unit 33 of the receiver 3. In the present embodiment, the trigger machine 5 includes a first trigger machine 5a located on the front-wheel side and a second trigger machine 5b located on the rear-wheel side.

The trigger machines 5a and 5b are offset with respect to the center line, which divides the vehicle 1 laterally into symmetric portions, so that each of the trigger machines 5a and 5b are separated from the associated wheels by different distances. In the present embodiment, the trigger machines are disposed on the left of the center line, with the first trigger machine 5a being located near the left front wheel 7b, and the second trigger machine 5b being located near the left rear wheel 7d. Therefore, the distance from the first trigger machine 5a to the right front wheel 7a is longer than the distance from the first trigger machine 5a to the left front wheel 7b. The distance from the second trigger machine 5b to the right rear wheel 7c is longer than the distance from the second trigger machine 5b to the left rear wheel 7d. The positional relationship among the first and second trigger machines 5a and 5b and the transceivers 2 attached to the respective wheels 7a to 7d, and the strengths of the triggering signals are devised so that the triggering signal sent from the first trigger machine 5a will be received only by the transceivers 2 attached to the left and right front wheels 7a and 7b respectively, and the triggering signal sent from the second trigger machine 5b will be received only by the transceivers 2 attached to the left and right rear wheels 7c and 7d respectively.

The trigger machines 5 may be mounted in any place not covered or surrounded with metal and, if possible, away from the danger of being hit with stones from the road surface such as, for example, in a liner or in a vehicle interior.

The ID registration initialization switch 6 is a switch to be used to execute ID registration procedure of automatically registering ID information associated with a subject vehicle, and may be manipulated, if necessary, by a user. For example, when the transceiver 2 is replaced with a new one due to replacement of a tire, if the ID registration initialization switch 6 is depressed, the ID registration procedure to be described later is performed in order to initialize ID information.

The tire inflation pressure detection system of the present embodiment is configured as mentioned above. Next, the operation of the tire inflation pressure detection system of the present embodiment will he described.

Normally, the tire inflation detection system detects the tire inflation pressures of the respective wheels 7a to 7d by using data elements associated with ID information that are already designated. However, if the ID registration initialization switch 6 is depressed, ID registration procedure is executed accordingly. Thereafter, data elements associated with ID information registered during the ID registration procedure are used in order to detect the tire inflation pressures.

The concept of an ID registration technique and an exemplary ID registration procedure will be described.

Figure 3:
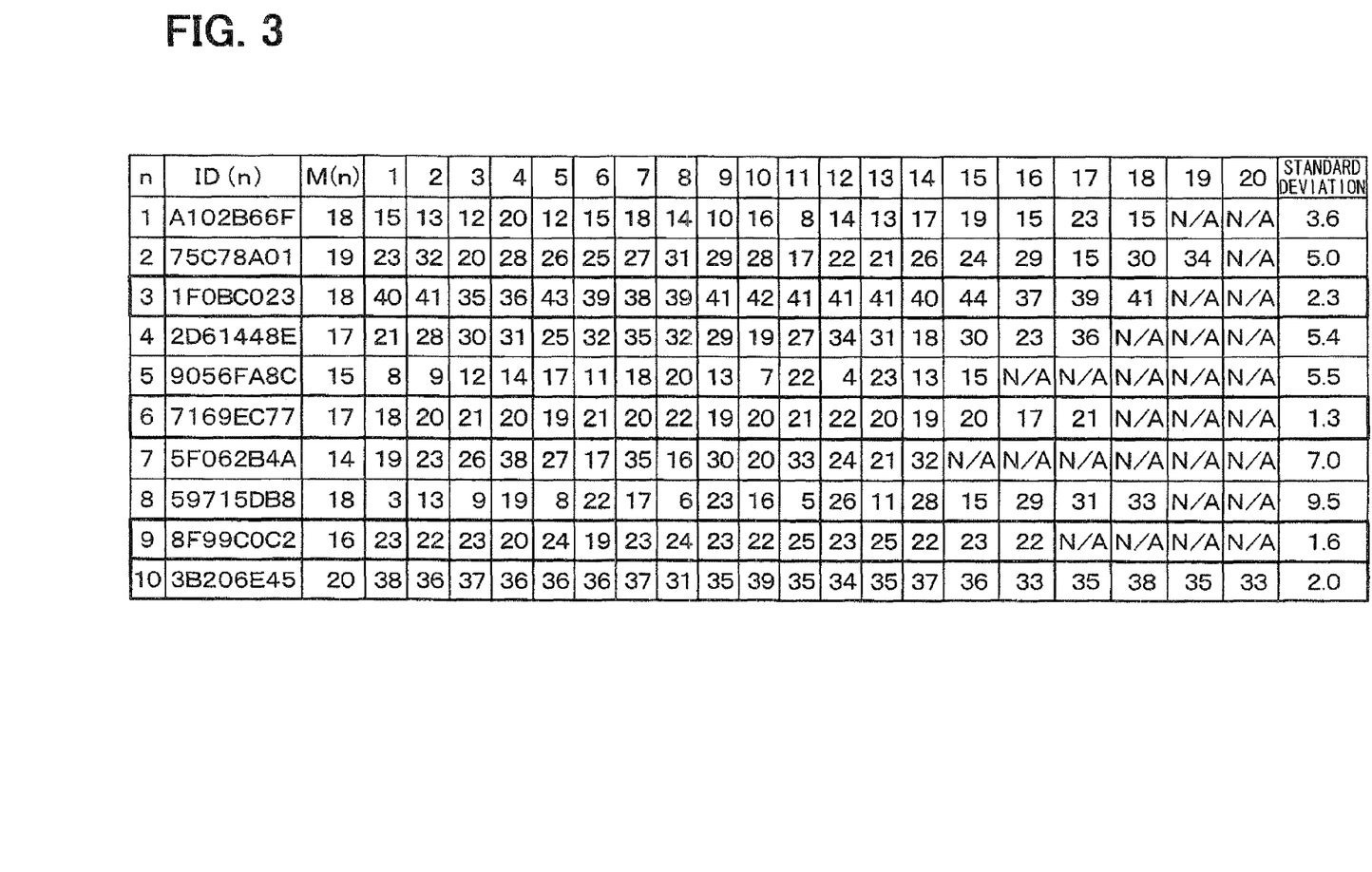
FIG. 3 is a tabular diagram listing exemplary elements of ID information and received strength data elements contained in all frames received by an exemplary receiver.

FIG. 3 is a diagram including a table listing data elements associated with ID information including received strength data elements that are included in all frames received by the receiver 3, when the ID registration initialization switch 6 is turned on and a triggering signal is outputted from the trigger machines 5 a predetermined number of times, such as twenty times in the present example. In FIG. 3, n denotes a number, such as an index, assigned to each received ID, ID(n) denotes actual ID information associated with the index n, and M(n) denotes the number of effective receptions of the information associated with the actual ID information for the corresponding index. Reference numerals 1 to 20 in the row across the top of the table denote the first to twentieth transmissions of a triggering signal. Each table row represent the numerical value of received strength data specified in association with each transmission number in relation to a particular ID information associated with a particular index. At the end of each row, for each index, a standard deviation a is specified as an indication of a degree of a variance among all of the received strength data elements that are collected as statistics for each of the twenty transmissions of the triggering signal, and is calculated according to an equation presented below. It should be noted that in FIG. 3, "N/A" stands for not available and signifies that an effective reception was not achieved.

$$\text{Standard deviation } \sigma = \sqrt{\frac{\text{sum of (measured value} - \text{mean value})^2}{\text{number of data items}}} \quad (1)$$

In Equation (1), the measured value refers to a received strength of each reception, and the mean value refers to a value calculated by dividing the sum of the received strengths of all receptions associated with each ID, by the number of receptions. The number of data items or elements corresponds to the number of receptions.

Generally, when a triggering signal is outputted in order to perform ID registration, the signal strength of the triggering signal is attenuated by an amount that is proportional to an increase in the distance from the trigger machine 5 that is a generation source of the triggering signal. Therefore, the received strength at the transceiver 2 located in a place close to the trigger machine 5, such as, in the subject vehicle has a large value. The received strength at the transceiver 2 located in a place far away from the trigger machine 5, such as, in another vehicle becomes small.

However, when the subject vehicle and another vehicle are driven side by side, there is a possibility that the received strength at the transceiver 2 attached to the other vehicle may be large. In such a case, an attempt to discriminate the subject vehicle from the other vehicle on the basis of the value of the received strength represented by received strength data contained in a frame returned from the transceiver 2 in response to the triggering signal may be unsuccessful or inaccurate.

Even when the subject vehicle and another vehicle are driven side by side, the subject vehicle and another vehicle rarely keep adjoining each other with the same distance held between them during the period of ID registration procedure. Therefore, a degree of a variance among received strengths arising at the time of collecting statistics of multiple received strength data elements is larger for those associated with the other vehicle than those for the subject vehicle. Specifically, in the case of the subject vehicle, the distance from the trigger machine 5 to the transceiver 2 fundamentally varies only by a change in the position of the transceiver 2 derived from the rotation of an associated one of the wheels 7a to 7d. However, in the case of the other vehicle, the distance from the trigger machine 5 to the transceiver 2 varies by a change in the distance between the subject vehicle and the other vehicle in addition to the change in the position of the transceiver 2 derived from the rotation of an associated one of the wheels 7a to 7d. Therefore, when the other vehicle is driven adjacently to the subject vehicle, even if a received strength represented by received strength data contained in a frame sent from the transceiver 2 in the other vehicle has a large value, the probability in deciding whether a particular ID information is associated with the transceiver 2 attached to the subject vehicle or ID information associated with the transceiver 2 attached to the other vehicle can be raised by checking a degree of a variance in the received strength.

Figure 4:
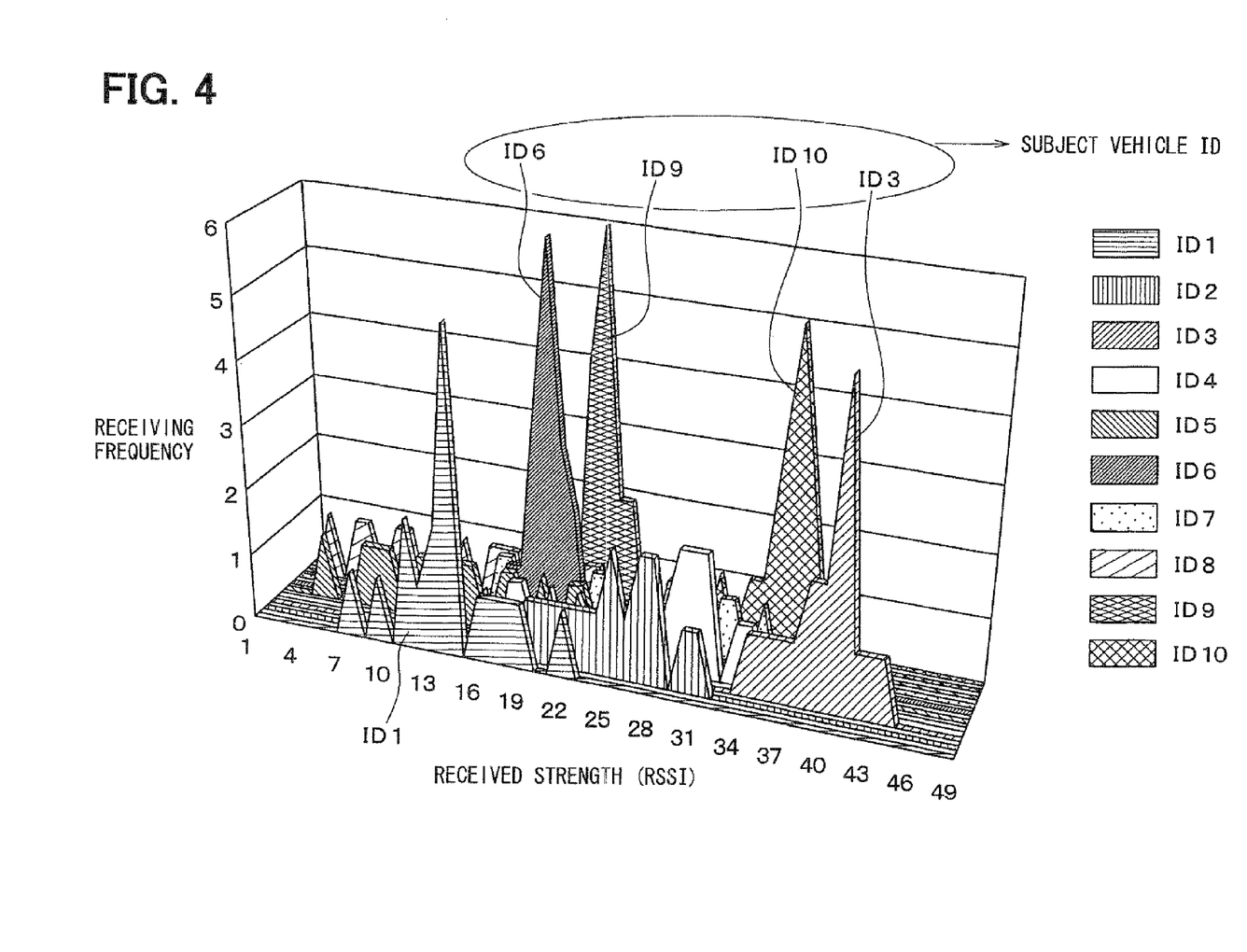
FIG. 4 is a graph illustrating statistical relative frequency of reception in relation to received signal intensities according to the results of received strength data elements shown in FIG. 3.

FIG. 4 is a graph showing the number of times, or relative frequency of reception of a particular signal associated with an ID in relation to received strengths as indicated as abscissas on the x-axis, number by number according to the statistical results of received strength data elements shown in FIG. 3. The numbers 3, 6, 9, and 10 are assigned to various IDs of the transceivers 2 attached to the subject vehicle, and the other numbers are assigned to IDs of the transceivers 2 attached to the other vehicle.

As illustrated, the degree of how frequently the numbers 3, 6, 9, and 10 assigned to the IDs of the transceivers 2 attached to the subject vehicle are received is high. Likewise, the degree of how frequently the number 1 assigned to the ID of the transceiver 2 attached to the other vehicle is received is high. As for a degree of a variance among received strengths or a distribution of received strengths, the degrees of variances associated with the numbers 3, 6, 9, and 10 assigned to the IDs of the transceivers 2 attached to the subject vehicle are small, but the degree of the variance associated with the number 1 assigned to the ID of the transceiver 2 attached to the other vehicle is large.

In the present embodiment, when a decision is made on whether ID information is ID information on the transceiver 2 attached to the subject vehicle or ID information on the transceiver 2 attached to another vehicle, the degree of a variance among received strengths is used.

Figure 5:
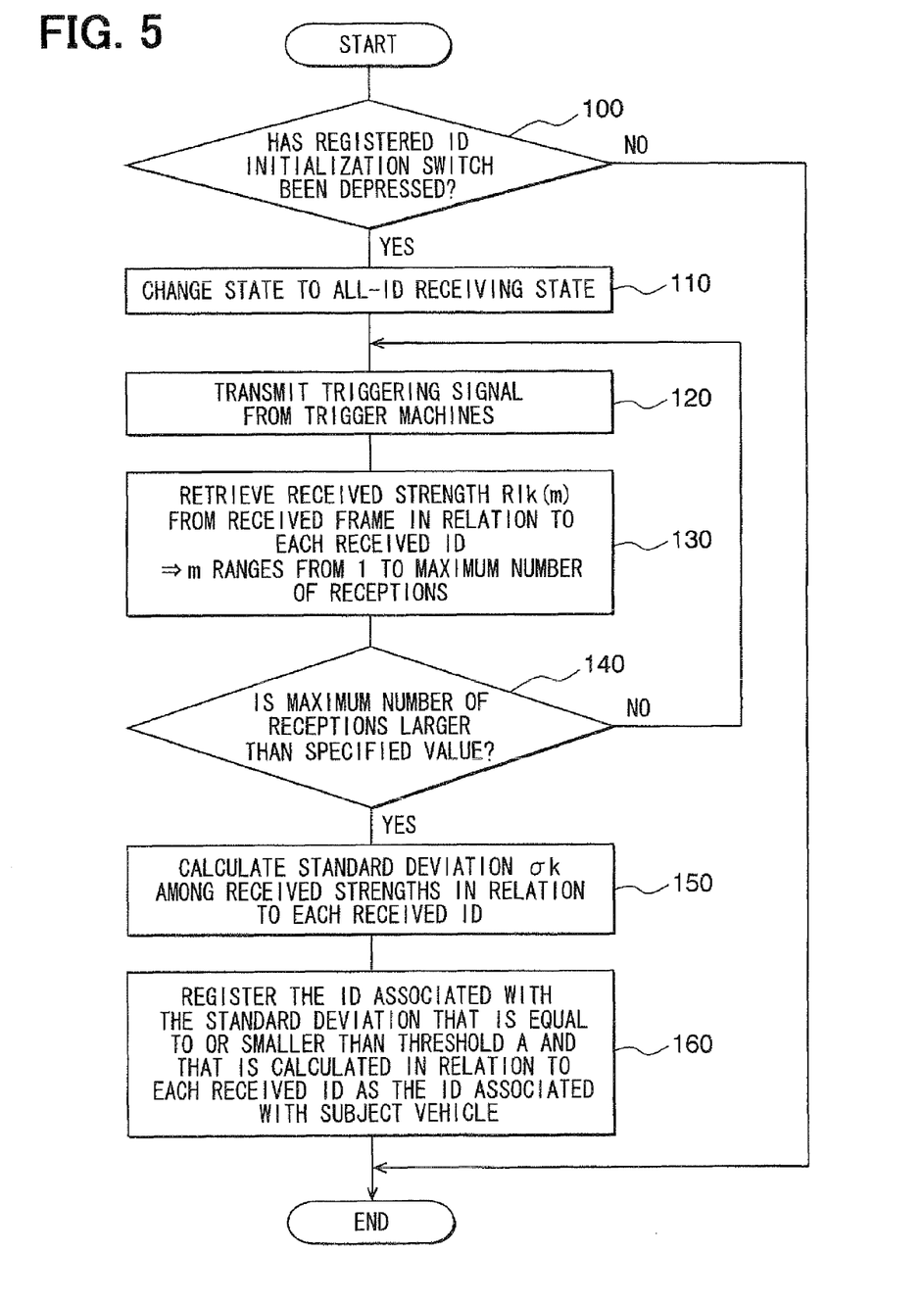
FIG. 5 is a flowchart illustrating an exemplary ID registering procedure.
Figure 6:
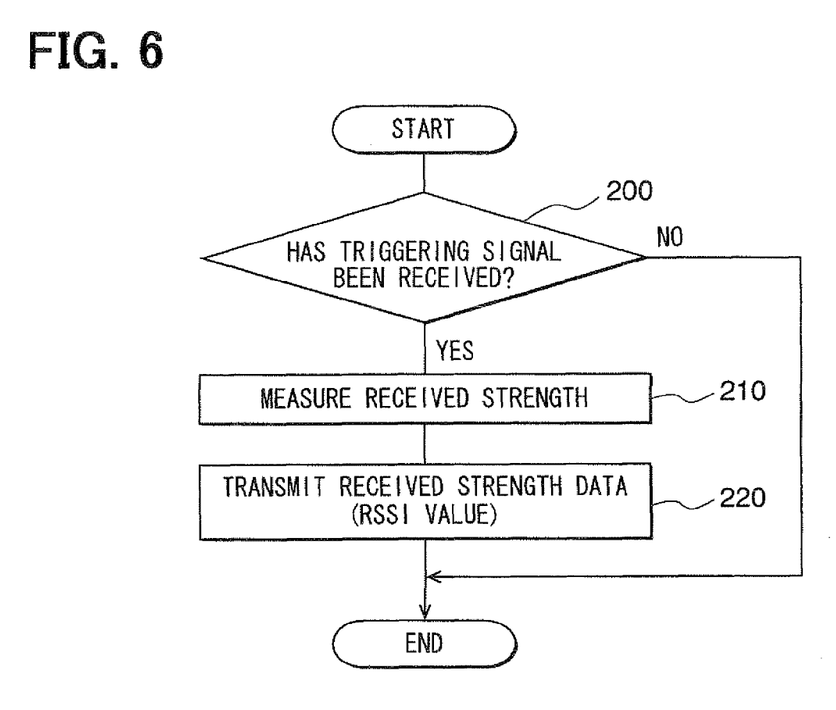
FIG. 6 is a flowchart illustrating an exemplary received strength measuring procedure to be performed on a transceiver side.

Based on the foregoing findings, the degree of a variance among received strengths is used in order to perform ID registration procedure. The ID registration procedure will be described below. FIG. 5 is a flowchart detailing the ID registration procedure. The present processing is executed at intervals of a predetermined control cycle after, for example, the ignition switch is switched from an OFF state to an ON state. FIG. 6 is a flowchart describing received strength measuring processing to be performed on the transceiver 2 side. The present processing may be executed at intervals of the predetermined control cycle. In order to suppress consumption of the capacity of the battery 24, the processing should be performed every time the transceiver 2 is changed from the sleep state to the wake-up state responsive to reception of a triggering signal.

As described in FIG. 5, it is decided whether the ID registration initialization switch 6 has been depressed. If the ID registration initialization switch 6 has been depressed, corresponding to "YES" at 100, the processing proceeds to 110. If the ID registration initialization switch 6 has not been depressed, corresponding to "NO" at 100, the processing is terminated.

At 110, the system is changed to an all-IDs receiving state. Before registered ID initialization is performed, elements of ID information having been registered previously are present. Therefore, even when a frame sent from the transceiver 2 of another vehicle is received by the receiver 3, if a decision is made based on ID information included in the frame that the frame is not sent from the transceiver 2 of the subject vehicle, the processing of deleting the received frame is carried out. However, the precondition for ID registration is that ID information on the subject vehicle and ID information on another vehicle have not yet been registered. Therefore, the states of the system are changed so that frames having all IDs appended thereto can be received.

The processing proceeds to 120. A triggering signal is outputted from the trigger machines 5. If the signal strength of the triggering signal is so large that even when the triggering signal is outputted from one of the first and second trigger machines 5a and 5b, the triggering signal can be received by all the transceivers 2 attached to the four wheels 7a to 7d, the triggering signal may be outputted from one of the first and second trigger machines 5a and 5b. In contrast, if when the triggering signal is outputted from the first trigger machine 5a, the triggering signal can be received only by the transceivers 2 attached to the front wheels 7a and 7b, and if when the triggering signal is outputted from the second trigger machines 5a and 5b, the triggering signal can be received only by the transceivers 2 attached to the rear wheels 7c and 7d, the triggering signal can be outputted sequentially or concurrently from both the first and second trigger machines 5a and 5b.

When the triggering signal is outputted, a received strength is measured on the transceiver 2 side. Specifically, for example as shown in connection with FIG. 6, if the triggering signal has been received, corresponding to "YES" at 200, the processing proceeds to 210 where the received strength is measured, that is, the RSSI value is obtained. The processing then proceeds to 220 where the received strength data representing the measured received strength is placed in a frame, and the frame is transmitted. The processing has been described as processing to be performed on the transceiver 2 side. It should also be noted that the processing can also be performed not only by the transceivers 2 in the subject vehicle but also by the transceivers 2 in another vehicle. Frames sent from the transceivers 2 in both the subject vehicle and another vehicle are received by the receiver 3 in the subject vehicle.

With reference again to FIG. 5, for each received ID and for each instance of triggering and signal transmission, a received strength represented by received strength data is retrieved from a corresponding received frame. The received strength associated with the index number for a given received ID is stored at 130 in association with the number of the reception up to n number of receptions. Hereinafter, the individual received strength associated with the given ID and a given one of the number of receptions shall be described as the received strength $RI_k(m)$, where k denotes the index number assigned to each ID, and m denotes the number of the reception ranging from 1 to some maximum number of receptions such as the number of receptions associated with a given ID appended to a frame up to the largest number of times the signal is generated. For example, a received strength $RI_3(4)$ signifies a received strength associated with received strength data received from the transceiver 2, with an ID corresponding to the ID having the index of 3 assigned thereto, at the time of the fourth reception of a frame with the corresponding ID.

It is then decided whether the maximum number of receptions is larger than a specified value. When statistics of received strengths associated with each ID is collected, a certain minimum amount of data is needed. The specified value of the minimum number of receptions regarded as being needed to collect a statistically significant sample is, for example, twenty receptions. Collection of a received strength $RI_k(m)$ is repeated until the maximum number of receptions exceeds the specified value.

If the maximum number of receptions is larger than a specified value, corresponding to a "YES" at 140, the processing proceeds to 150. A standard deviation $\sigma_k$ of a received strength is computed in relation to each received ID. The computation of the standard deviation $\sigma$ is performed using Equation 1 described above. The received strength $RI_k(m)$ collected at 140 is adopted as the measured value in Equation 1. For each received ID, the mean value is calculated by dividing the sum of received strengths $RI_k(m)$ by the number of all receptions of received strength data elements for the given ID. Thus, the standard deviation $\sigma_k$ signifying a degree of a variance among received strengths associated with each ID is computed.

Thereafter, the processing proceeds to 160. For all of the ID values it is determined whether the standard deviation $\sigma_k$ computed at 150 is smaller than a threshold A. The ID associated with a standard deviation $\sigma_k$ smaller than the threshold A is registered as the ID of the transceiver 2 attached to the subject vehicle. As mentioned above, as long as the transceiver 2 is attached to the subject vehicle, the degree of a variance among received strength data elements is smaller than the degree of a variance among received strength data elements received from the transceiver 2 attached to another vehicle. If the standard deviation indicates that the degree of a variance is smaller than the threshold A, the relevant ID can be recognized as the ID of the transceiver 2 attached to the subject vehicle. Therefore, based on whether the standard deviation $\sigma_k$ is smaller than the threshold A, the ID of the transceiver 2 attached to the subject vehicle can be discriminated from the ID of the transceiver 2 attached to the other vehicle.

When the above described ID registration procedure is thus completed, the receiving states of the receiver 3 are switched so that the receiver 3 will receive only the registered IDs. Thereafter, tire inflation pressure detection is performed based on the IDs.

To be more specific, the tire inflation pressure detection system enters a periodic transmission mode. As mentioned above, a detection signal that represents the tire inflation pressure or the temperature in a tire and is produced by the sensing unit 21 is inputted from each of the transceivers 2 to the control unit 22. The detection signal is, if necessary, subjected to signal processing in order to produce data concerning the tire inflation pressure. The data is contained in a frame to be transmitted together with ID information on the transceiver 2, and then transmitted to the receiver 3 via the radiofrequency transmitting unit 23 at intervals associated with a predetermined cycle.

When a frame is transmitted from the transceiver 2, the frame is received through the antenna 31 of the receiver 3, and inputted to the control unit 33 via the receiving unit 32. In the control unit 33, data representing a tire inflation pressure and data representing the temperature in a tire are retrieved from the received frame. A previous temperature value is, if necessary, corrected based on the data representing the newly obtained temperature, and the tire inflation pressure can also be corrected. Since the ID information is appended to the frame, the ID information is collated or otherwise compared with the ID information registered during ID registration. It is determined whether the received ID information is the same as the registered ID information associated with the subject vehicle or whether the ID information is associated with another vehicle. Only when the received ID information is the same as the ID information associated with the subject vehicle, are operations associated with the tire inflation pressure detection carried out.

If a change in the tire inflation pressure is small, that is, if a difference between the received tire inflation pressure and the previous tire inflation pressure does not exceed a predetermined threshold value, the cycle at intervals of which the tire inflation pressure is detected is held intact, for example, is retained at one minute intervals. If the change in the tire inflation pressure exceeds the predetermined threshold value, the cycle is decreased to, for example, 5 seconds such that the quantity is monitored more frequently.

Thereafter, if it is determined that the obtained tire inflation pressure falls below a predetermined threshold value, the control unit 33 outputs a signal to the indicator 4 so that an indication of the condition can be provided thereby. Thus, a vehicle driver may be informed of a decreased tire inflation pressure condition of any of the wheels 7a to 7d.

Finally, when the ignition switch is changed from the ON state to the OFF state, a trigger command signal is outputted from the control unit 33 of the receiver 3 to the trigger machines 5. A triggering signal is outputted from the trigger machines 5. When the triggering signal is inputted to the control unit 22 via the receiving antenna 27 and triggering signal receiving unit 25, the transceiver 2 enters the sleep state. Thus, the tire inflation pressure detection by the tire inflation pressure detection system is terminated.

According to the tire inflation pressure detection system to which the position-of-wheel detection system of the present embodiment is adapted, a degree of a variance among received strength data elements is obtained in relation to each of the received IDs during ID registration. An ID relating to a small degree of a variance is recognized as the ID of the transceiver 2 attached to the subject vehicle. Therefore, even when the subject vehicle and another vehicle are driven side by side, the ID of the transceiver 2 attached to the subject vehicle can be reliably discriminated from the ID of the transceiver 2 attached to the other vehicle.

Position-of-wheel detection can be performed on the wheels 7a to 7d on the basis of received strength data elements, though the detailed description of the position-of-wheel detection is omitted because the position-of-wheel detection is described in JP-A-2007-15491 or the like. By performing the position-of-wheel detection, information that specifies to which of the wheels 7a to 7d each of the transceivers 2 is attached can be provided. Therefore, after ID registration is performed in accordance with the present embodiment, the position-of-wheel detection can specify which of the wheels 7a to 7d has experienced a decrease in the tire inflation pressure.

Second Embodiment

A second embodiment will be described below. The tire inflation pressure detection system of the present embodiment is the same as to the tire inflation pressure detection system of a first embodiment except a condition for discriminating an ID associated with a subject vehicle. Only the difference will be described below.

In the present embodiment, a condition for discriminating an ID associated with a subject vehicle is defined in the ID registration procedure described in FIG. 5. Specifically, at 160, a received ID relating to received strength data elements whose standard deviation $\sigma_k$ is smaller than the threshold A and which are collected in relation to each of received IDs is registered as an ID associated with the subject vehicle. However, the number of IDs having received strength data elements, whose standard deviation $\sigma_k$ is smaller than the threshold A, may be larger than the number of wheels of the subject vehicle to which the respective transceivers 2 are attached. Therefore, an additional condition for discriminating an ID associated with the subject vehicle can be used. Accordingly, the same number of IDs as the number of wheels of the subject vehicle IDs to which the respective transceivers 2 are attached should be registered. In order to accomplish the discrimination the IDs can be registered in ascending order of the standard deviation $\sigma_k$ starting with the smallest value.

Thus, even when the number of IDs having a standard deviation $\sigma_k$ smaller than the threshold A is larger than the number of wheels of the subject vehicle to which the respective transceivers are attached, the IDs of the transceivers 2 attached to the subject vehicle can be more reliably discriminated from the IDs of the transceivers 2 attached to another vehicle.

Third Embodiment

A third embodiment will be described below. A tire inflation pressure detection system of the present embodiment is identical to the tire inflation pressure detection system of a second embodiment except that an ID associated with a subject vehicle is discriminated under another condition described in relation to a second embodiment. The difference alone will be described below.

In the present embodiment, at 160 in the ID registration procedure described in FIG. 5, only the same number of IDs as the number of wheels of the subject vehicle to which the respective transceivers 2 are attached should be registered. Accordingly, the IDs are registered in ascending order of the standard deviation $\sigma_k$ among received strength data elements relating to each of received IDs.

In such a scenario, the standard deviation $\sigma_k$ need not be compared with the threshold A, but IDs may be registered in ascending order of the standard deviation $\sigma_k$ only. The IDs of the transceivers 2 attached to the subject vehicle can be reliably discriminated from the IDs of the transceivers 2 attached to another vehicle.

Other Embodiments

The above described embodiments include an exemplary construction in which the antenna 31 is one common antenna. However, when the antenna 31 includes one common antenna, identifying the wheels 7a to 7d to which the respective transceivers 2 are attached may be relatively difficult. Accordingly in accordance with alternative embodiments, four antennas may be respectively provided in association with the wheels 7a to 7d.

In the above described embodiments, after the ignition switch is changed from the OFF state to the ON state, an ID registration procedure may be carried out. However, when both the subject vehicle and the other vehicle are stopped, both a degree of a variance among received strength data elements associated with the subject vehicle and a degree of a variance among received strength data elements associated with the other vehicle are small. If possible, therefore, the ID registration procedure should only be performed during driving.

In the above described embodiments, the ID registration initialization switch 6 is included. When the ID registration initialization switch 6 is depressed, ID registration procedure is executed. Alternatively, the ID registration procedure may be performed at any time. For example, tire rotation or tire replacement may be detected. When the tire rotation or replacement is detected, the ID registration procedure may be automatically carried out. The tire rotation or replacement can be recognized based on a switch mounted in a vehicle for position-of-wheel detection (not shown) being depressed or based on a tilt sensor (not shown) mounted on a vehicle body detecting a tilt of the vehicle body 8.

In a first embodiment, both the first and second trigger machines 5a and 5b are disposed on the left side of the vehicle 1. Alternatively, the first and second trigger machines 5a and 5b may be disposed on the right side of the vehicle 1. Likewise, in a second embodiment, the first trigger machine 5a is disposed by the side of the left front wheel 7a and the second trigger machine 5b is disposed by the side of the right rear wheel 7c. Alternatively, the first trigger machine 5a may be disposed by the side of the right front wheel 7a, and the second trigger machine 5b may be disposed by the side of the left rear wheel 7d. Instead of two trigger machines such as the first and second trigger machines 5a and 5b, only one trigger machine 5 may be included, or a larger number of trigger machines 5, larger than two, may be included.

As the above described embodiments, embodiments in which the present invention is applied to a four-wheel vehicle have been described. The present invention is not limited to the four-wheel vehicle. The present invention can be applied to a position-of-wheel detection system or a tire inflation pressure detection system of a vehicle having a larger number of wheels, such as, a heavy duty vehicle.

In the above described embodiments, a standard deviation is adopted as an example of a statistic, metric, or the like, indicating a degree of a variance. Alternatively, any other statistic, metric, or the like, may be adopted. For example, a statistic, metric, or the like, such as a variance value among received strength data elements may be adopted. A degree of a variance may be computed, for example, using a positive or negative strong correlation coefficient with respect to the statistic such as the standard deviation or variance value. A value whose absolute value gets larger along with an increase in the standard deviation or variance value, such as, a value whose absolute value gets larger as long as the standard deviation or variance value has a positive value, and gets smaller as long as the standard deviation or variance value has a negative value may be adopted as indicating a degree of a variance.

What is claimed is:

1. A tire inflation pressure detection system comprising:
    transceivers disposed on a plurality of wheels including respective tires, each of the transceivers including a receiving unit that receives a triggering signal with a received strength, a first control unit that processes a frame by obtaining received strength data associated with the received strength of the triggering signal, and placing the received strength data in the frame, the frame having ID information associated with the each of the transceivers appended thereto, and a transmitting unit that transmits the frame processed by the first control unit;
    trigger machines disposed on a vehicle body and outputting the triggering signal; and
    a receiver disposed on the vehicle body and including a receiving unit that receives the frame, and a second control unit that decides, based on the received strength obtained from the received strength data contained in the frame, to which of the plurality of wheels the each of transceivers is attached, wherein:
    the second control unit includes an ID registration means that automatically registers the ID information of the transceiver of a subject vehicle; and
    the ID registration means includes a trigger output means for causing the triggering signal to be output from the trigger machines at an ID registration time; a collecting means for collecting received strength data elements in relation to the each of the transceivers on the basis of the ID information appended to the frame when the frame is received; a degree-of-variance arithmetic means for computing a degree of a variance among the received strength data elements collected by the collecting means; and a deciding means for recognizing which of the each of the transceivers associated with the ID information are associated with the subject vehicle when a degree of a variance computed by the degree-of-variance arithmetic means is smaller than a threshold, and for registering the ID information of the each of the transceivers with the subject vehicle when the ID information is recognized.

2. The tire inflation pressure detection system according to claim 1, wherein, out of the transceivers having received strength data elements with degrees of variance smaller than the threshold, the deciding means registers the ID information of a number of the transceivers equal to the number of wheels of the subject vehicle, in ascending order of the degree of variance.

3. A tire inflation pressure detection system comprising:
    transceivers disposed on a plurality of wheels including respective tires, each of the transceivers including a receiving unit receiving a triggering signal at a received strength, a first control unit obtaining the received strength of the triggering signal received by the receiving unit, and placing received strength data in a frame having ID information associated with the each of the transceivers appended thereto, and a transmitting unit transmitting the frame processed by the first control unit;
    trigger machines disposed on a vehicle body and outputting the triggering signal; and
    a receiver disposed on the vehicle body, the receiver including a receiving unit receiving the frame, and a second control unit deciding to which of the plurality of wheels the transceiver is attached based on the received strength data contained in the frame, wherein:
    the second control unit includes an ID registration means that automatically registers the ID information of the transceiver of a subject vehicle; and
    the ID registration means includes a trigger output means for outputting the triggering signal from the trigger machines at an ID registration time; a collecting means for receiving the frame and collecting received strength data elements in relation to the each of the transceivers on the basis of the ID information appended to the frame when the frame is received; a degree-of-variance arithmetic means for computing a degree of a variance among the collected received strength data elements associated with the each; and a deciding means for recognizing which of the each of the transceivers associated with the ID information are associated with the subject vehicle, the deciding means recognizing a same number of the transceivers as the number of wheels of the subject vehicle, the deciding means recognizing the received strength data elements associated with the in ascending order of the degree of a variance computed by the degree-of-variance arithmetic means, and that registers the elements of ID information.

4. The tire inflation pressure detection system according to claim 3, wherein the degree-of-variance arithmetic means computes as the degree of a variance one of a standard deviation and a variance value among the received strength data elements.

5. In a tire inflation pressure detection system for detecting a tire inflation pressure of a plurality of tires mounted on a corresponding plurality of wheels attached to a subject vehicle, a method for identifying specific transceivers associated with the subject vehicle from a plurality of transceivers, the method comprising:

establishing a registration mode for registering the identified specific transceivers associated with the subject vehicle;

transmitting a triggering signal from triggering units mounted on the subject vehicle, the triggering signal transmitted m number of times during the registration mode, the triggering signal capable of being received by the plurality transceivers with a received strength, the method including for each of the transmitted m triggering signals:

receiving the triggering signal in at least some of the plurality of transceivers, the receiving the triggering signal causing a first control unit in each of the at least some of the transceivers to obtain the received strength of the received triggering signal and place received strength data associated with the received strength and ID information associated with the each of the at least some transceivers in a frame;

transmitting the frame to a receiver disposed in the vehicle in response to the receiving the triggering signal, the receiver storing the frame including the received strength data in relation to each of the at least some transceivers by the ID information;

computing in relation to each of the at least some transceivers based on the ID information, a degree-of-variance among the stored received strength data elements for the each of the at least some transceivers and each of the m transmitted triggering signals;

identifying a number of the at least some transceivers, the number being the same as the number of the wheels of the subject vehicle, as ones of the plurality of transceivers that are attached to the subject vehicle, the number of the at least some transceivers recognized in ascending order of the computed degree-of-variance; and registering the recognized number of transceivers as the identified specific transceivers based on the ID information.

* * * * *